United States Patent
Davis et al.

(10) Patent No.: US 11,068,383 B2
(45) Date of Patent: *Jul. 20, 2021

(54) SERVICE ORIENTED ARCHITECTURE INFRASTRUCTURE FOR BUSINESS PROCESS VERIFICATION AND SYSTEMS INTEGRATED TESTING

(71) Applicant: INTERNATIONAL BUSINESS MACHINES CORPORATION, Armonk, NY (US)

(72) Inventors: Stephen M. Davis, Poughkeepsie, NY (US); Philip T. Ho, Braintree, MA (US); Rakesh K. Parimi, Perth Amboy, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/656,664

(22) Filed: Oct. 18, 2019

(65) Prior Publication Data

US 2020/0050539 A1 Feb. 13, 2020

Related U.S. Application Data

(60) Continuation of application No. 13/448,745, filed on Apr. 17, 2012, now Pat. No. 10,528,455, which is a
(Continued)

(51) Int. Cl.
*G06F 11/36* (2006.01)
*G06F 11/30* (2006.01)
(Continued)

(52) U.S. Cl.
CPC ...... *G06F 11/3688* (2013.01); *G06F 11/2294* (2013.01); *G06F 11/3006* (2013.01);
(Continued)

(58) Field of Classification Search
None
See application file for complete search history.

(56) References Cited

U.S. PATENT DOCUMENTS 6,643,650 B1 * 11/2003 Slaughter ............... G06F 9/465
6,742,059 B1 * 5/2004 Todd ..................... H04L 41/046
709/219

(Continued)

OTHER PUBLICATIONS

White, Ron "How Computers Work", Millennium Ed., Que Corporation, Indianapolis, IN, 1999.

*Primary Examiner* — Chrystina E Zelaskiewicz
(74) *Attorney, Agent, or Firm* — L. Jeffrey Kelly; Andrew M. Calderon; Roberts Calderon Safran & Cole, P.C.

(57) ABSTRACT

A service oriented architecture (SOA) infrastructure is provided for business process verification and systems integrated testing. The system includes one or more primary agents each dedicated to detecting a particular business process. The system further includes one or more action agents each configured to provide a verification function for the particular business process. Additionally, the system includes a service manager configured to provide context look-up services for the one or more primary agents to determine which action agent of the one or more action agents is responsible for a particular verification function of the particular business process.

20 Claims, 8 Drawing Sheets

Related U.S. Application Data division of application No. 12/140,602, filed on Jun. 17, 2008, now abandoned.

(51) Int. Cl.
   *G06Q 10/10* (2012.01)
   *G06F 11/22* (2006.01)
   *G06Q 20/36* (2012.01)

(52) U.S. Cl.
   CPC ...... *G06F 11/3089* (2013.01); *G06F 11/3664* (2013.01); *G06Q 10/10* (2013.01); *G06Q 20/3674* (2013.01)

(56) References Cited

U.S. PATENT DOCUMENTS

| | | |
|---|---|---|
| 2002/0173984 A1 | 11/2002 | Robertson et al. |
| 2007/0106564 A1 | 5/2007 | Matotek et al. |
| 2009/0216874 A1* | 8/2009 | Thain .................. H04L 43/04 709/224 |

\* cited by examiner

| SOA Layer by Test Phase | Unit Test | Function Test or Integration Test | System Test | System Integration Test | Acceptance Test | Operability Test |
|---|---|---|---|---|---|---|
| Operational Systems (Applications & Data) | | Y | Z | Z | Z | Z |
| Services Components | X | Y | Z | Z | Z | Z |
| Services | Y | Y | Y | X | X | Z |
| Business Process | X | Y | X | Z | Z | Z |
| Consumer | X | Y | X | X | X | X |
| Integration (Enterprise Service Bus) | X | Y | X | X | X | X |
| QoS (Quality of Service) Layer | | | X | X | X | X |
| Data Architecture & Business Intelligence Layer | | | | Z | Z | Z |
| Governance Layer | | | | X | X | X |

FIG. 8

SERVICE ORIENTED ARCHITECTURE INFRASTRUCTURE FOR BUSINESS PROCESS VERIFICATION AND SYSTEMS INTEGRATED TESTING

CROSS-REFERENCE TO RELATED APPLICATION

The present application is a divisional application of co-pending U.S. application Ser. No. 12/140,602, filed on Jun. 17, 2008, the contents of which are incorporated by reference in its entirety herein.

FIELD OF THE INVENTION

The invention relates to a service oriented architecture (SOA) infrastructure for business process verification and systems integrated testing.

BACKGROUND DESCRIPTION

Companies have sought to integrate existing systems in order to implement information technology (IT) support for business processes that cover present and prospective systems requirements needed to run the business end-to-end. To accomplish such tasks, Service Oriented Architecture (SOA) has been created which is designed to unify business processes by structuring applications as an ad hoc collection of small modules called services. People both inside and outside the company can use these applications across enterprise systems. SOA can thus support integration and consolidation activities within complex enterprise systems.

More specifically, SOA is a computer architectural style for creating and using business processes, packaged as services. SOA also defines the IT infrastructure to allow different applications to exchange data and participate in business processes. These functions are loosely coupled with the operating systems and programming languages underlying the applications. The SOA provides integration of third party products into the overall information technology landscape with provision for reuse of resources and elimination of redundant development and support costs by facilitating the rapid development of business solutions.

In conventional systems, SOA separates functions into distinct units (services), which can be distributed over a network and can be combined and reused to create business applications. SOAs build applications out of software services that are intrinsically unassociated units of functionality, which have no calls to each other embedded in them. The SOA is not tied to a specific technology and, as such, it may be implemented using a wide range of technologies, including SOAP (Simple Object Access Protocol), RPC (Remote Procedure Call), DCOM (Distributed Component Object Model), CORBA, Web Services or WCF (Windows Communication Foundation). The key to SOA is independent services with defined interfaces that can be called to perform their tasks in a standard way, without the service having foreknowledge of the calling application, and without the application having or needing knowledge of how the service actually performs its tasks.

However, existing SOA test tools are limited to single application specific functional, performance, end to end testing with short running transactions. As such, currently available SOA test tools also have limited SOA test coverage for unit and functional tests only. That is, the current SOA tools have excellent performance testing, but with limited functional verification. The current SOA test tools also have performance testing without functional verification. These same tools also have a lack of integration capability with non-compatible test tools, have synchronous transaction execution and are primarily web services oriented test solutions. Current SOA tools also lack modeling capabilities for end-to-end process validations support, and do not support batch transaction processing Accordingly, there exists a need in the art to overcome the deficiencies and limitations described hereinabove.

SUMMARY OF THE INVENTION

In a first aspect of the invention, a system comprises one or more primary agents each dedicated to detecting a particular business process. The system further comprises one or more action agents each configured to provide a verification function for the particular business process. Additionally, the system comprises a service manager configured to provide context look-up services for the one or more primary agents to determine which action agent of the one or more action agents is responsible for a particular verification function of the particular business process.

In yet another aspect of the invention, a method for verifying business processes. The method comprises providing a platform independent central context look-up service for one or more primary agents to match an action agent which is responsible for a particular verification function of a particular business process detected by the one or more primary agents.

In another aspect of the invention, a system for deploying an application for verifying business processes. The system comprises a computer infrastructure having program code embedded on a readable medium and being operable to match a primary agent with an action agent via a central context look-up service such that the primary agent which detected a start of a business process can invoke the action agent which is responsible for a particular verification function of the business process.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention relates to a service oriented architecture (SOA) infrastructure for business process verification and systems integrated testing. In embodiments, the present invention provides a service component oriented architecture solution implementation for verifying a scenario executed synchronously or asynchronously by a multitude of systems communicating over any known communication protocol. Also, the system provides full coverage verification for all software test phase across an integrated set of systems.

In further embodiments, the system and method of the present invention provides a platform that is an independent framework that enables verification of the business process implemented in a multitude of systems using, for example, BPEL, or a standard programming language such as JAVA, C++, etc. The present invention also provides report metrics on a business process functional results end to end performance. The system and method also provides a developer framework and process for writing unit test cases, which can be extended for creating system integration test cases.

Moreover, in implementation, the present invention uses primary agents and action agents communicating through a service manager to accomplish the goals of scenario verification. In embodiments, the service manager provides look up services for the agents and aggregates reports in a central repository. The system and method of the invention also uses integrated report techniques for gathering information report scenario execution results (e.g., functional, performance, etc.). The system is also 100% compatible with any third party test tool and provides real time reporting and can use simulation or automated generation programs as drivers.

More specifically, as should be understood in view of the description herein, in embodiments, an action agent is responsible for validation a business process within an application. The action agent can respond to web service calls by the service manager or primary agent or another action agent to initiate the validation work. The action agents are intended to be smart agents, i.e., having the logic to validate part of a business process, in case of long running transactions. In addition, the action agent can invoke other action agent(s) to do part of the validation work. This can happen when a business process is externalized across one or more application(s). The action agent can also provide functional verification that a business process in totality has executed successfully. The action agent also provides necessary performance related metrics which can be fed to an external performance analysis system such as ITCAM (IBM Tivoli Composite Application Monitoring) tool. The action agents are implemented as BPELs and communicate using Web Services, but can also be implemented as Java Logic.

In embodiments, the primary agent performs the role for detecting the start of a major activity. A major activity is defined as the main transaction that initiates execution of various business processes and transactions across the set of systems. The primary agent is considered the initiator entity, i.e., the one that initiates validation of the business process across one or more applications. The actual validation work, though, is performed by the action agents. In implementation, the primary agent makes a series of web service calls to the service manger to determine which action agent should be the first one to begin the validation effort. The primary agent then finally makes the web service call to the first action agent. The primary agent is unaware of how many and what action agents will finally get used for the validation of the business process, and is insensitive to the nature of business process, singular or externalized or whether contains long running transactions. Also, the primary agent does no change unless the business process, it is responsible for, changes with regards to how the business process and where it may be initiated. For this reason, the primary agent rarely changes, despite how the underlying business process is implemented how the implementation may change over time. The primary agents are implemented as BPELs and communicate using Web Services, but can also be implemented as Java Logic.

In embodiments, the service manager provides Governance, Orchestration of Web Services and maintaining location services of the various Agents. The service manager can also implement an ESB such as MQ or DataPower, which is also known as IEB (IBM Enterprise Bus). The service manager can also provide operation functions such as starting and stopping of primary agents and action agents.

As, in view of the description provided below, the present invention can be considered a true SOA Testing Method. The present invention can be used for advanced testing needs of SOA Projects and also can be a true standalone SOA implementation by itself. Also, as should be understood in view of the description herein, the additional loading due to SOA Test Agents on Test infrastructure is advantageously no more than 10-15% of the loading of test applications.

System Environment

Figure 1:
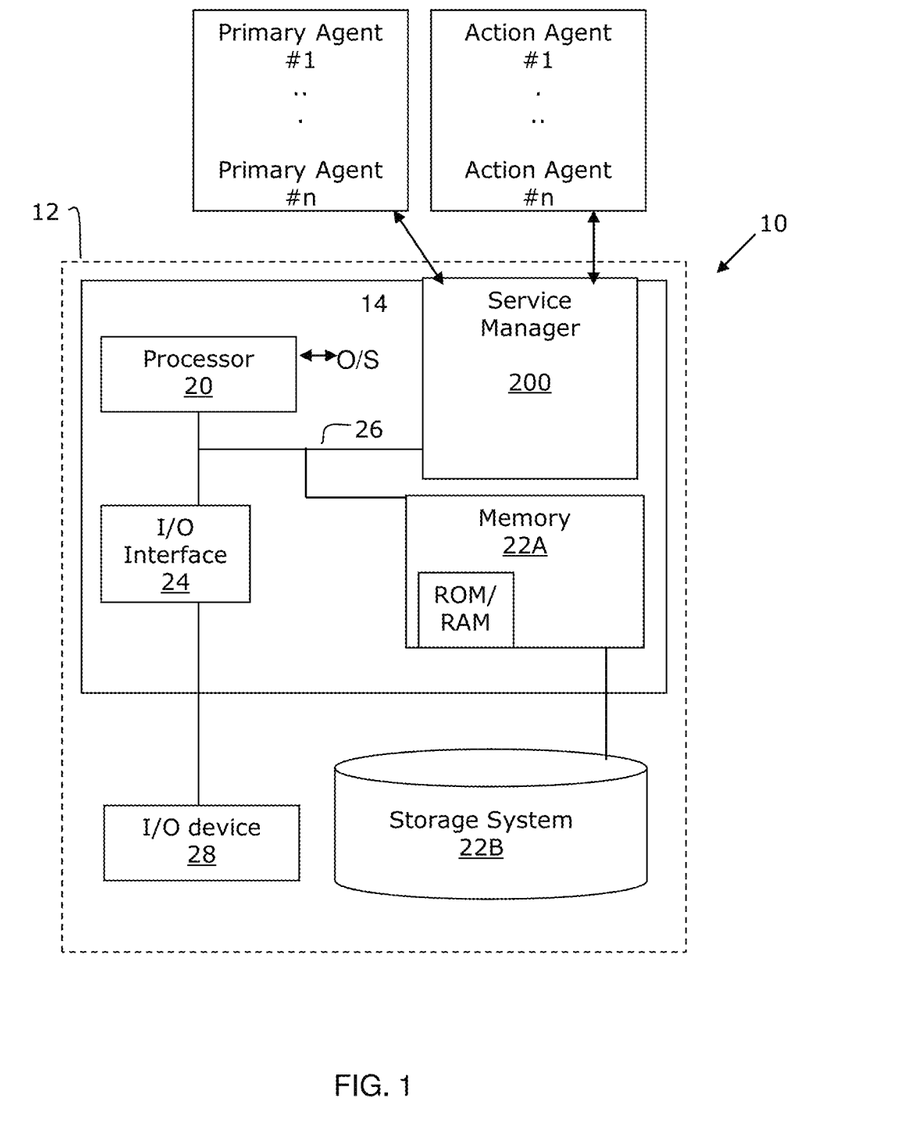
FIG. 1 shows an illustrative environment for implementing the processes in accordance with the invention.

FIG. 1 shows an illustrative environment 10 for managing the processes in accordance with the invention. The environment 10 includes a computer infrastructure 12 that can perform the processes described herein. The computer infrastructure 12 includes a computing device 14 that includes a service manager 200. The service manager 200 is configured to provide a communication channel for a plurality of primary agents and action agents. The communications link can comprise any combination of wired and/or wireless links; any combination of one or more types of networks (e.g., the Internet, a wide area network, a local area network, a virtual private network, etc.); and/or utilize any combination of transmission techniques and protocols. As such, the agents can communicate across subnets.

Also, the infrastructure is platform independent such that the agents can be implemented on Linux operating systems with another agent implemented on Windows (Windows is a trademark of Microsoft Corporation), for example. Thus, the present invention provides interoperability between different systems and programming languages.

The service manager 200 also helps to identify and match particular primary agents and respective action agents, as well as allow action agents to hand off responsibilities (verification) to other action agents, amongst other functions discussed herein. As discussed in more detail below, the primary agent is dedicated to a particular business process and is configured to detect a start of a long running process. The business process can be any known business process. The action agent, on the other hand, is configured to verify the business process.

The service manager 200 is in communication with a storage system 22B. The storage system 22B can be a database that includes a look up table for matching primary agents with action agents, as well as maintaining reports. The look up table may include, for example, addresses (references) of the primary agents and action agents, as well as a description of the functionality of the primary agents and the action agents. By providing such description of the functionality, it is now possible to increase the flexibility of the business enterprises for, e.g., software/systems testing of SOA driven architectures. This can be accomplished by matching primary agents with the appropriate action agents for the verification of business processes.

The computing device 14 includes a processor 20, a memory 22A, an input/output (I/O) interface 24, an external I/O device/resource 28 and a bus 26. The I/O device 28 can comprise any device that enables an individual to interact with the computing device 14 or any device that enables the computing device 14 to communicate with one or more other computing devices using any type of communications link. The bus 26 provides a communications link between each of the components in the computing device 14.

The processor 20 executes computer program code (e.g., embodied on software) that is stored in memory 22A and/or storage system 22B. The computer program code includes the processes of the invention as discussed herein. While executing computer program code, the processor 20 can read and/or write data to/from memory 22A, storage system 22B, and/or I/O interface 24.

In embodiments, a computer program product accessible from a computer-usable or computer-readable medium provides the program code. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. In each embodiment, the program code and hardware can be created using standard programming and engineering techniques, respectively.

A service provider can create, maintain, deploy and support the infrastructure and/or program code described in FIG. 1. The service provider, such as a Solution Integrator, could offer to perform the processes described herein for payment from customer(s) under a subscription and/or fee agreement and/or the service provider can receive payment from the sale of advertising content to one or more third parties.

Architecture of the Present Invention

Figure 2:
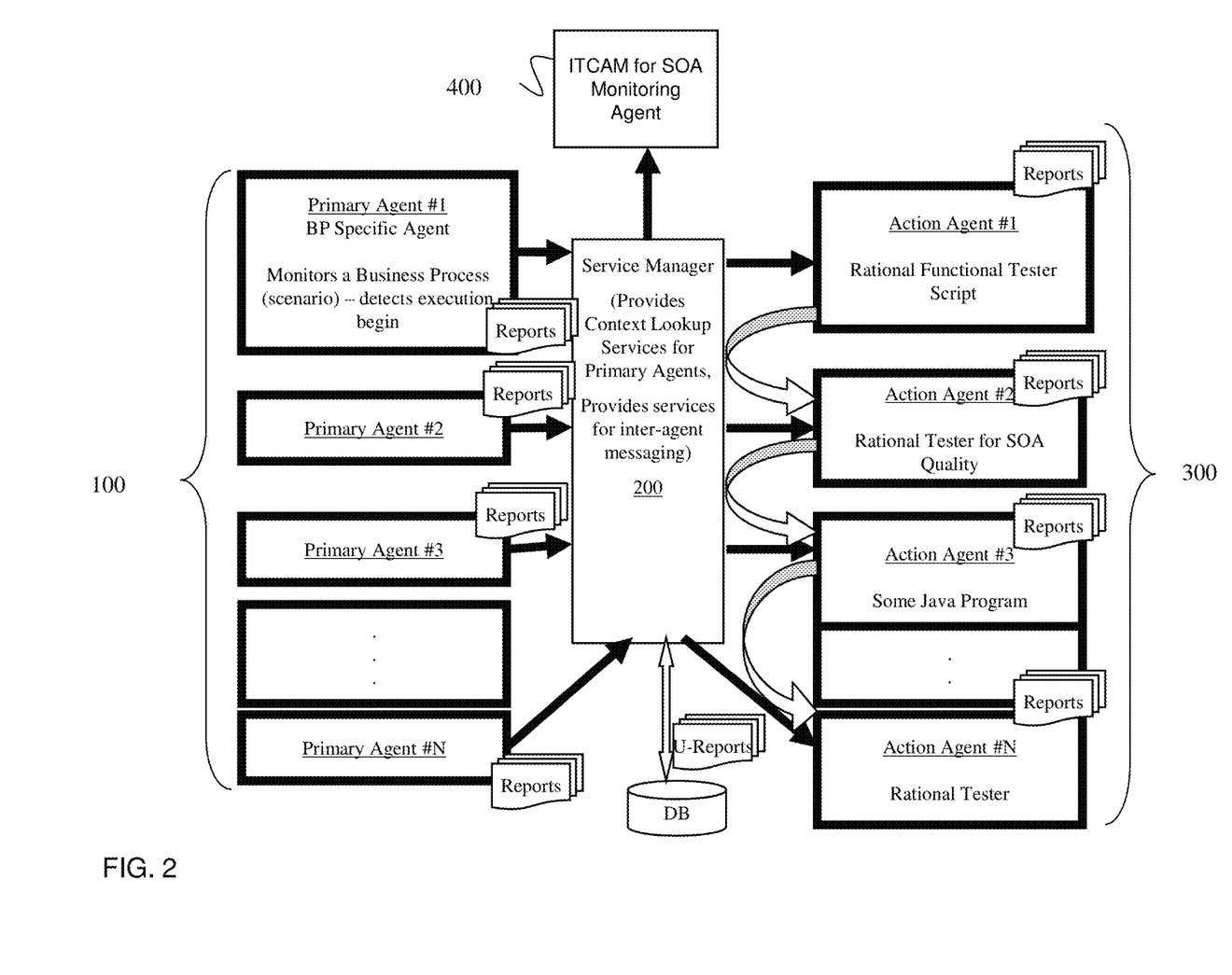
FIG. 2 shows an architecture in accordance with an aspect of the invention.

FIG. 2 shows an architecture in accordance with an aspect of the invention. More specifically, FIG. 2 shows a plurality of primary agents 100 in communication with a service manager 200. The primary agents 100 communicate with the service manager 200 via any known communication link (which may be platform independent). The primary agents 100 are configured to monitor execution of business process and more specifically are configured to detect asynchronous execution of respective business processes in order to initialize the verification process for the respective business process. As should be understood by those of skill in the art, each primary agent 100 can be configured to be responsible for the constant monitoring and detection of a particular business process. The primary agents 100 can be implemented using a common interface such as JAVA logic or BPEL, for example, and can be attached to a trigger that initiates a business process. The primary agents 100 can also be configured to generate and output a report to the service manager 200 using a common logging rule.

The service manager 200 provides context look-up services for the primary agents 100 to determine which action agent 300 is responsible for a particular verification function. For example, upon detection of a business process by a primary agent, the primary agent will contact the service manager 200 to determine which action agent is responsible for a particular verification process in the business process. The service manager 200 thus provides de-coupling of the primary agent (sensor) from the action agent (validator with optional functional executor). Also, the service manager 200 provides the ability to add a new primary agent or action agent as well as the ability to add new business processes (scenarios) (with or without new agents) without disrupting an existing "test run". Accordingly, in essence, the service manager 200 acts as a central communication channel for the coordination of the primary agents 100 and action agents 300.

The service manager 200 can be implemented as a web service, a legacy service or a service virtualization. A focus of Web services is to make functional building blocks accessible over standard Internet protocols that are independent from platforms and programming languages. These services can be new applications or just wrapped around existing legacy systems to make them network-enabled.

In implementation, the service manager 200 will identify an action agent 300 responsible for a verification of a business process detected by a primary agent. The service manager 200 will provide the address (reference) of the action agent to the responsible primary agent for the identified business process. In turn, the primary agent will invoke the action agent (outside of the service manager) via a respective communication link and protocol such as, for example, TCP/IP, to verify a scenario.

In further embodiments, the service manager 200 also provides services for inter action agent communication, e.g., allows action agents 300 the capabilities to query for other action agents' services in order to request execution of a subset of the scenario verification. For example, in cases where an action agent 300 responsible for a verification of a business process does not have the needed functionality, it can contact the service manager 200 in order to identify another action agent 300 that has the needed functionality. In this scenario, the service manager 200 will provide the address (reference) of such action agent to the requesting action agent. In turn, the action agent will invoke the newly identified action agent to perform the required verification process of another business process. This is especially applicable when the primary agent requests verification of a complex business process (e.g., a set of greater than two business processes) which cannot be verified by a single action agent. This can be an iterative execution for a scenario verification, for example. Also, the service agent 200 provides one interface as a service for recording results published by an action agent.

The action agents 300 are standalone agents which are configured to execute business process (e.g., scenario) verification on-demand, as and when requested by a primary agent. The action agents 300 are also complete and self-sufficient embodiments of set of scripts for verification of a business process; that is, the action agents are a service component providing testing services for the business process. The action agents can also be monitoring agents when the business process is not triggering based.

In particular, the action agents 300 are responsible for verifying business process. As shown in the non-limiting illustrative example of FIG. 2, the action agents 300 can be responsible for verifying: (i) Rational Function Tester (RFT) Script; (ii) Rational Tester for SOA Quality; (iii) JAVA Program; and/or (iv) Rational Tester. Of course, those of skill in the art should understand that the action agents 300 could be configured to verify a host of other business processes such as, for example, to simulate human actions and legacy system verifier (JAVA Agent). The action agent is also not limited to the role of a test driver. (A test driver is a program for executing transactions issued by a system. Integrated Systems many times have simulators that execute transactions for simulating end to end systems behavior.)

The action agents 300 can be implemented in JAVA logic or BPEL, for example. Moreover, the action agents can verify by any means such as, for example, DB2, ORACLE, MQ interface etc., and is not limited to GUI, web-services verification. In embodiments, the action agents 300 always verify logic of business processes and do not need to playback (only if required).

As further shown in FIG. 2, the primary agents 100 and the action agents 300 can provide reports concerning the initiation and verification of business processes. The reports can be generated asynchronously. The reports can be compiled by the service manager 200, which saves the reports in the database (e.g., storage 22b). In embodiments, the service manager 200 compiles the reports to form a single report on a particular business process. The results reported can thus include different types such as, for example, a simple test result (single) and a complex test result (a collection of test results). Also, the service manager can communicate with other monitoring agents 400 such as, for example Tivoli® (Tivoli is a registered trademark of International Business Machines Corp.)

Processes in Accordance with an Aspect of the Invention

Figure 3:
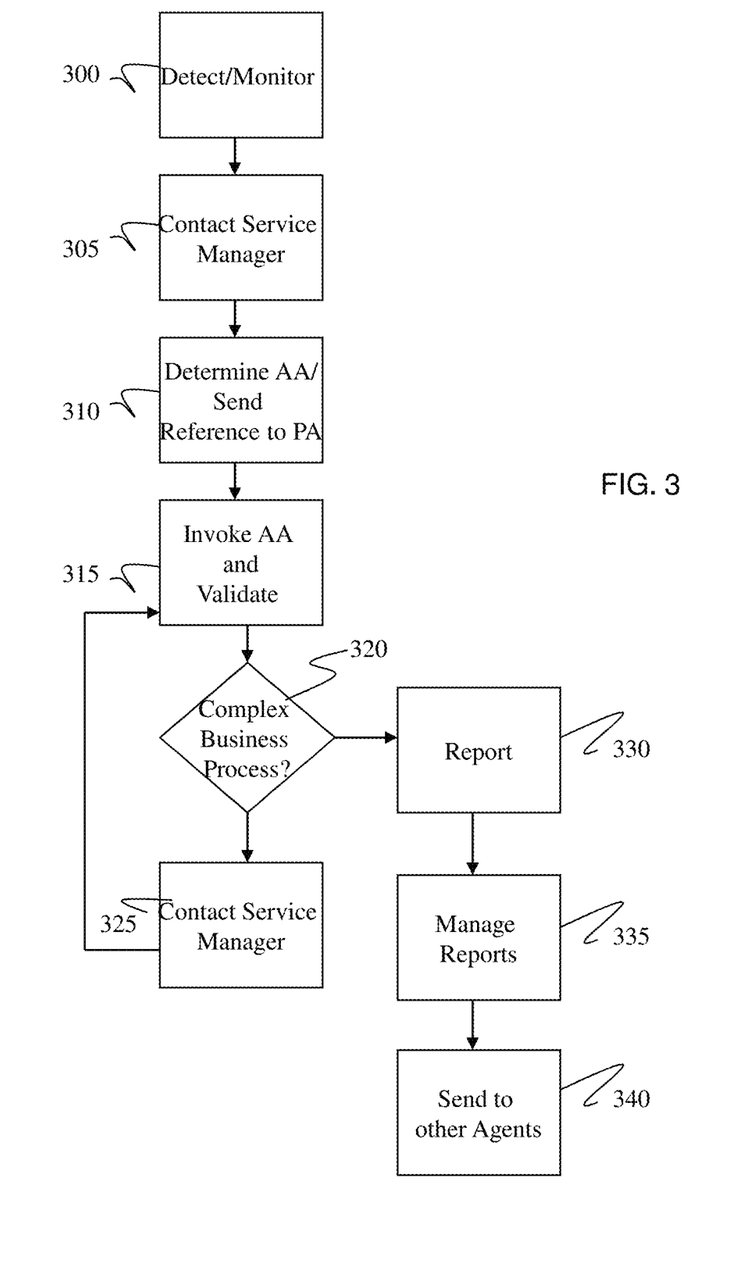
FIG. 3 shows a flow diagram of processes in accordance with an aspect of the invention.

FIG. 3 is a flow diagram showing processing steps of embodiments of the invention. FIG. 3 may equally represent a high-level block diagram of components of the invention implementing the steps thereof. The steps of FIG. 3 may be implemented on the computing infrastructure of FIG. 1 using computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Referring to FIG. 3, at step 300, the primary agent detects a business process. This may be done by way of any monitoring process. Also, it should be understood that this process may be asynchronous such that different agents can monitor and detect different business processes at different times. At step 305, the primary agent queries the service manager to determine which action agent can be invoked for the detected business process. At step 310, the service manager determines the appropriate action agent via a look up table, for example. The address or reference of the action agent is then provided to the primary agent. At step 315, the primary agent invokes the action agent at which time, the action agent begins the verification process.

At step 320, a determination is made as to whether the business process is a complex business process in which case the action agent will need to invoke another action agent to verify other scenarios (business processes). If there is a complex business process, the process will continue at step 325. At step 325, the action agent queries the service manager to determine which action agent can be invoked for the additional business process. At step 325, the service manager determines the appropriate action agent via a look up table, for example. The requesting action agent, at step 315, invokes the action agent. At this step, the new action agent begins the verification process of the additional business process. Steps 315 and 325 can be iterative until there are no additional business processes that require verification.

At step 330, the action agent can generate a report concerning the verification process. At step 335, the service manager can manage the reports such as, for example, consolidating reports concerning a long business process. At step 340, the service manager can provide reports to another service or agent.

It should be understood by those of skill in the art that the steps shown in FIG. 3 may be provided in different order. For example, the reports may be generated prior to a determination as to whether there is a complex business process.

It should be understood by those of skill in the art that the interactions between the Primary Agent, Service Manager and Action Agent are through web service calls. Referring to the roles and definitions of Service Manager, the Service Manager provides mechanisms for the Primary Agent and Action Agent to interact with one another or for the Action Agent and another Action Agent to interact with one another. Business Process validation results are ultimately collected by the Service Manager, through web service calls from the Action Agent(s), and processed using the composite or non-composite (e.g., singular) nature of the target business process. The collected validation data of business processes, within the Service Manager, can then be fed to external analysis and monitoring tools such as ITCAM (IBM Tivoli Composite Application Monitoring). Because of the inherent SOA implementation (web process/BPEL implementations of the Primary and Action Agents, communication using web service calls across all three entities) the Service Manager can readily interface with any SOA based monitoring or analytical tool, which is an advantageous benefit of the present invention.

Design Specifications

Figure 4:
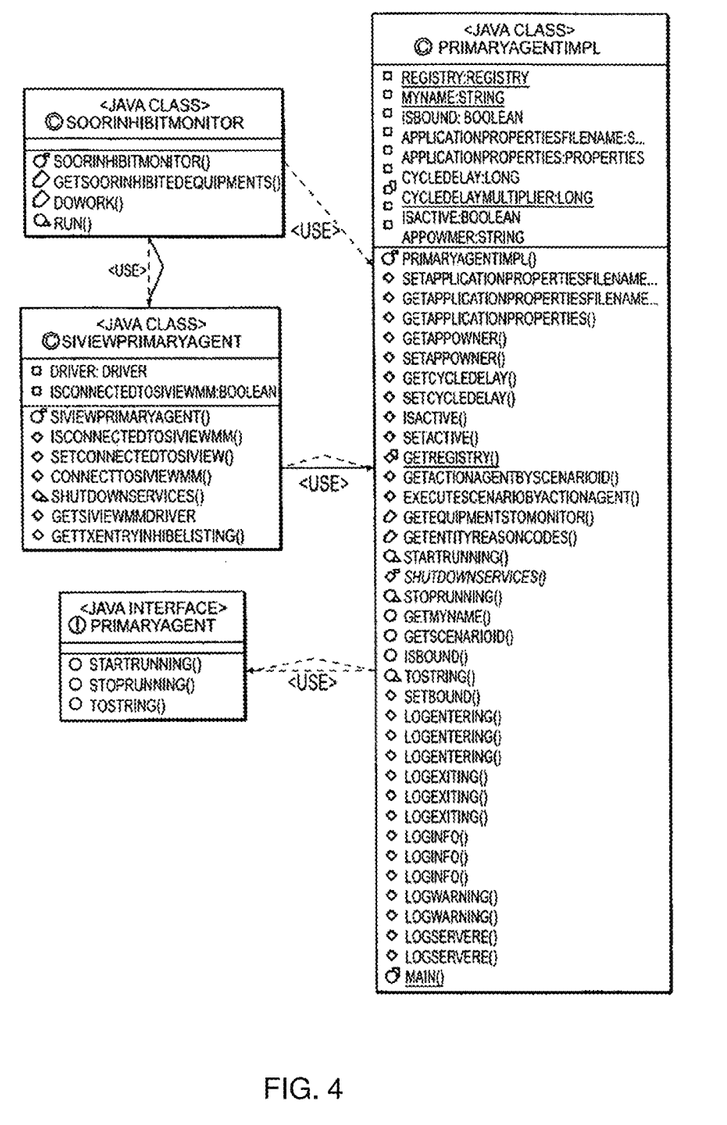
FIG. 4 shows design specifications for a primary agent in accordance with one aspect of the present invention.
Figure 5:
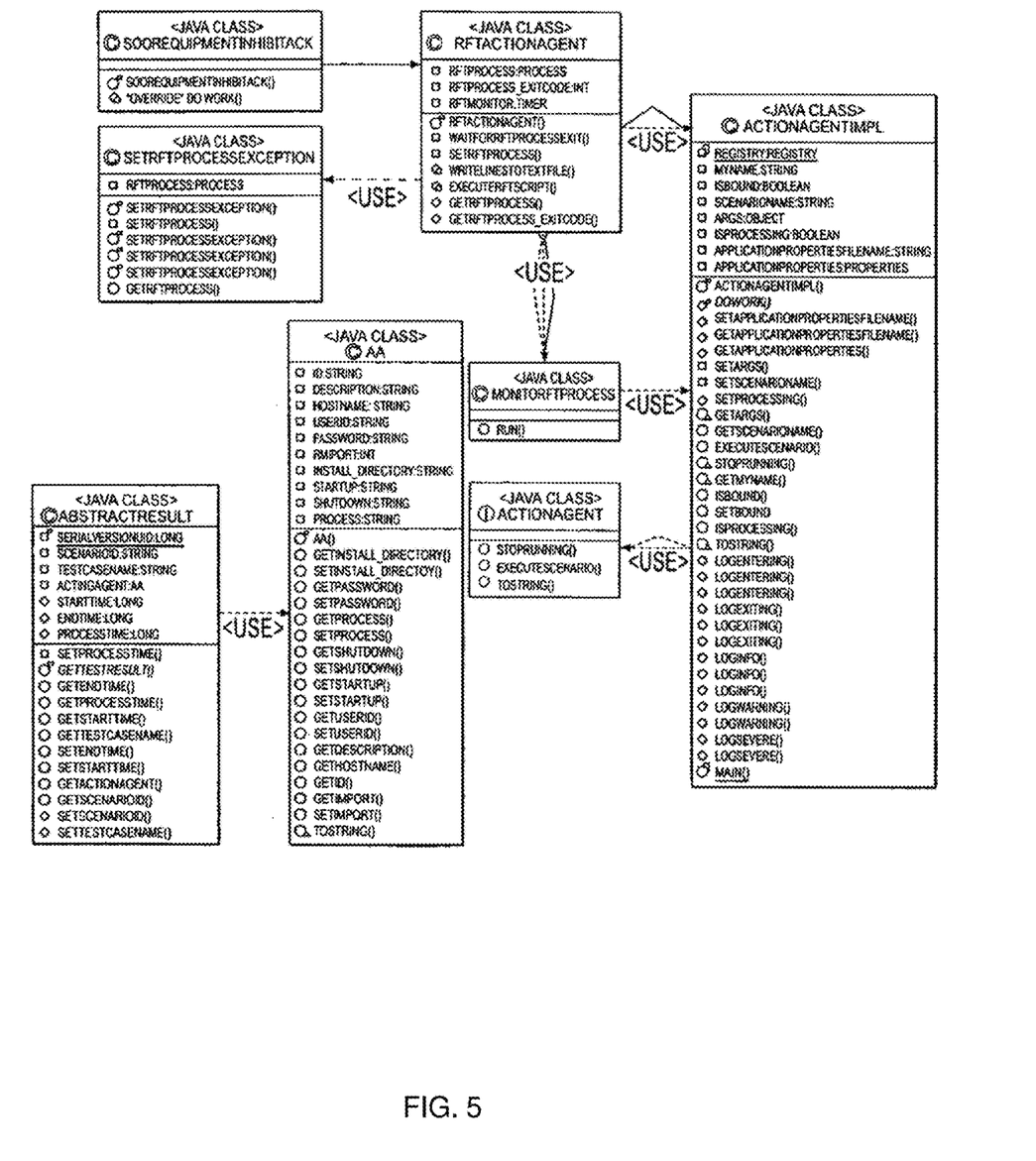
FIG. 5 shows design specifications for an action agent in accordance with one aspect of the present invention.

FIG. 4 shows design specifications for a primary agent in accordance with one aspect of the present invention. As discussed above, a primary agent is very specific for a business process (scenario). The primary agent can be built with JAVA classes. These classes may include, for example, a PrimaryAgentImpl abstract class, which is the root class for implementing all of the primary agents. PrimaryAgent is the interface that defines the functions for any implementing Primary Agent class. SiViewPrimary agent is an abstract class that extends the PrimaryAgentImpl class providing necessary functions and interfaces to detect start of a business process in the SiView system. SOORInhibitMonitor is the class that extends SiViewPrimaryAgent and is responsible for detecting the start of "SOOR Inhibit" business process in the SiView system FIG. 5 shows design specifications for an action agent in accordance with one aspect of the present invention. As discussed above, an action agent performs the verification of a scenario, as requested by the primary agent is very specific for a business process (scenario). The primary agent can be built with JAVA classes. These classes may include, for example, ActionAgentImpl abstract class, which is the root class for implementing all of the action agents. ActionAgent is the interface class that defines the basic functions to be performed by an Action Agent. RFTActionAgent is an abstract class extending the ActionAgentImpl that provides some basis services for invoking a Rational Functional Tester script (via a command line, i.e., externally). This class also has the ability to monitor how long the external RFT script stays executing while tracking functional and performance metrics. SOOREquipmentInhibitAck is an implemented example of the RFTActionAgent. This class can launch the RRFT script for opening WSPC group->chart-Ack Inhibit, as well as to check that the equipment has been removed from SiView MM, for example. WSPC Group is a logical entity that defines collection of similar WSPC charts. WSPC is the Web based Statistical Process Control system. MonitorRTFProcess is a n assist class that monitors Rational Functional tester script for the purpose of providing metrics for performance data collection of the business process being monitored. Class AA is provides the specifications for accessing Action Agent related data through web service invocations initiated by a Primary Agent or by an Action Agent. AbstractResult is an abstract class that provides specifications for what is required to collect the necessary metrics—functional and performance.

Figure 6:
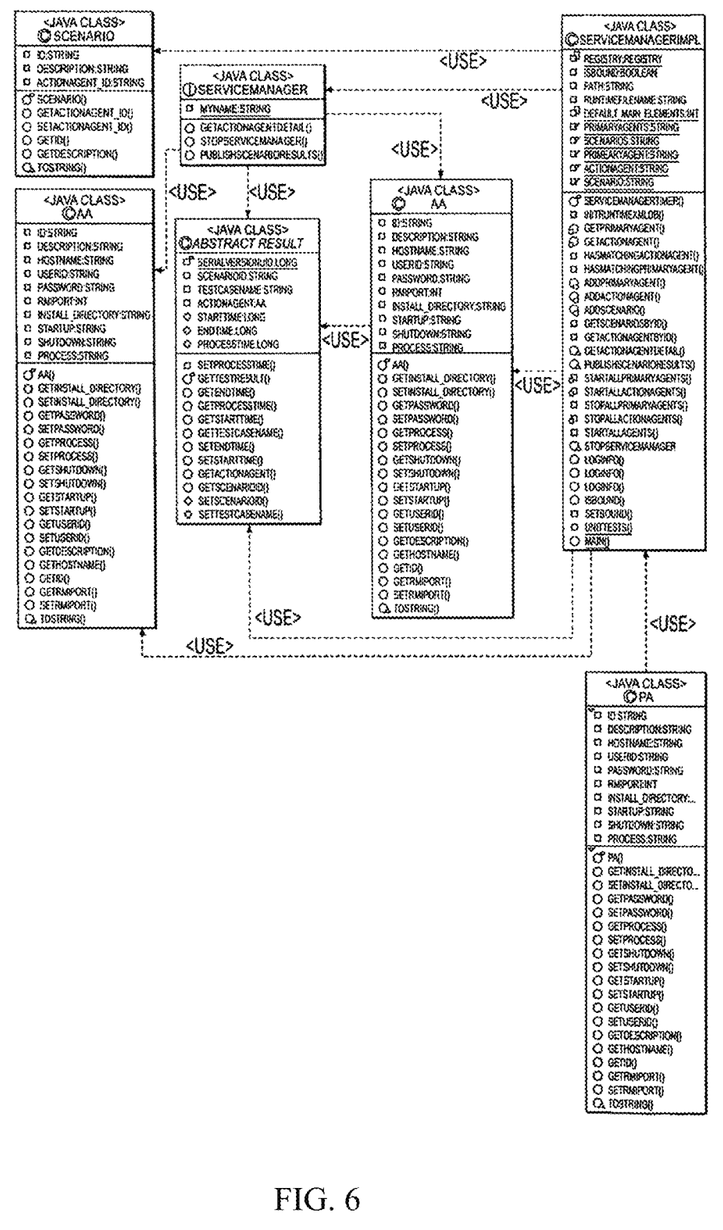
FIG. 6 shows design specifications for a service manager in accordance with one aspect of the present invention.

FIG. 6 shows design specifications for a service manager in accordance with one aspect of the present invention. The ServiceManagerImpl is the main class for the service manager (interface) services. This class is used by the PrimaryAgentImpl classes for obtaining the action agent details for executing a validation of a scenario. This class is also used by the action agent for obtaining details for another action agent in order to assist in the validation of a complex scenario, for example. The PA class is a serialized container for the primary agent details and the AA class is the serialized container for the action agent details. The Scenario class is a serialized container for the scenario details. The AbstractResults are invocations by the action agent for recording of the scenario results at the central repository of the service manager.

Figure 7:
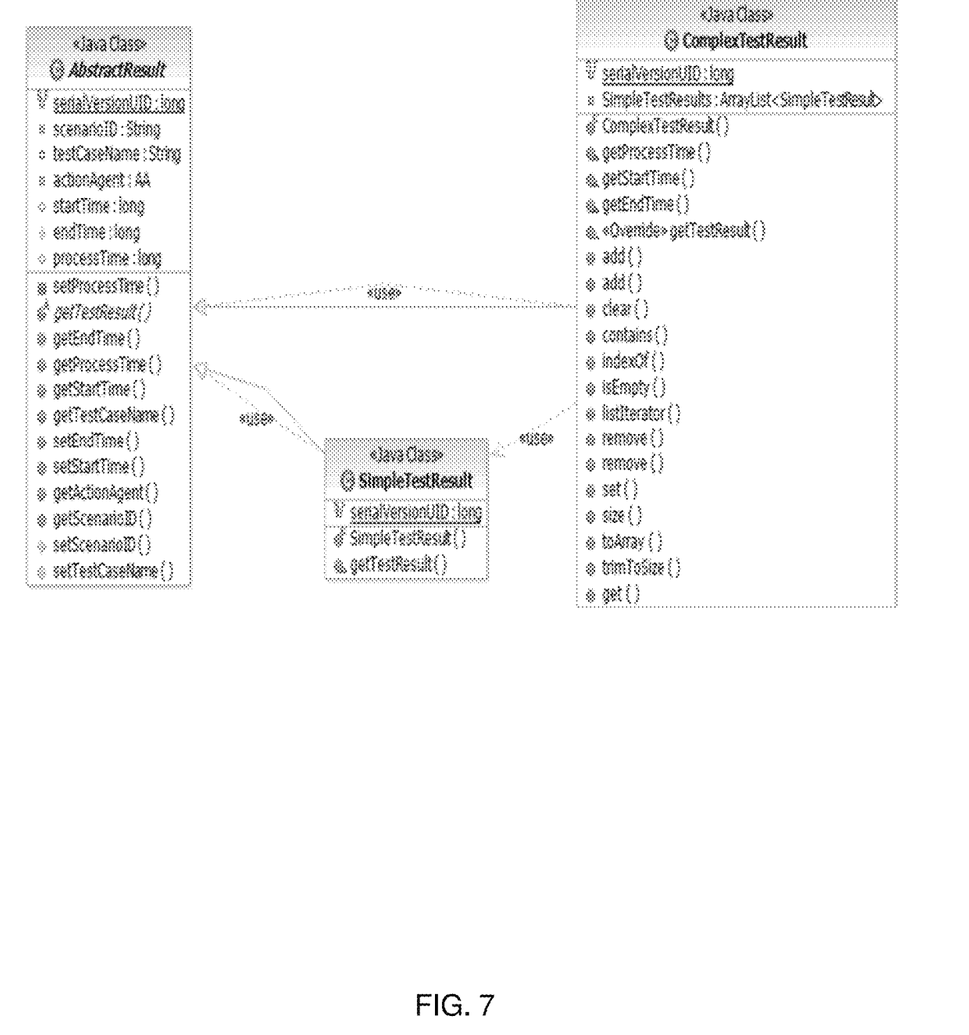
FIG. 7 shows design specifications for a test result collection class in accordance with one aspect of the present invention.

FIG. 7 shows design specifications for a test result collection class in accordance with one aspect of the present invention. AbstractResult is an abstract class that provides specifications for what is required to collect the necessary metrics—functional and performance. SimpleTestResult is an example implementation of the AbstractTestResult class for the purpose of collecting results for an internalized business process—one that runs within a single application and is not the long running type. ComplexTestResult is an example implementation of the AbstractTestResult class for the purpose of collecting results for a long running and possibly externalized business process—including ones that runs across multiple applications.

Achieved Benefits

Figure 8:
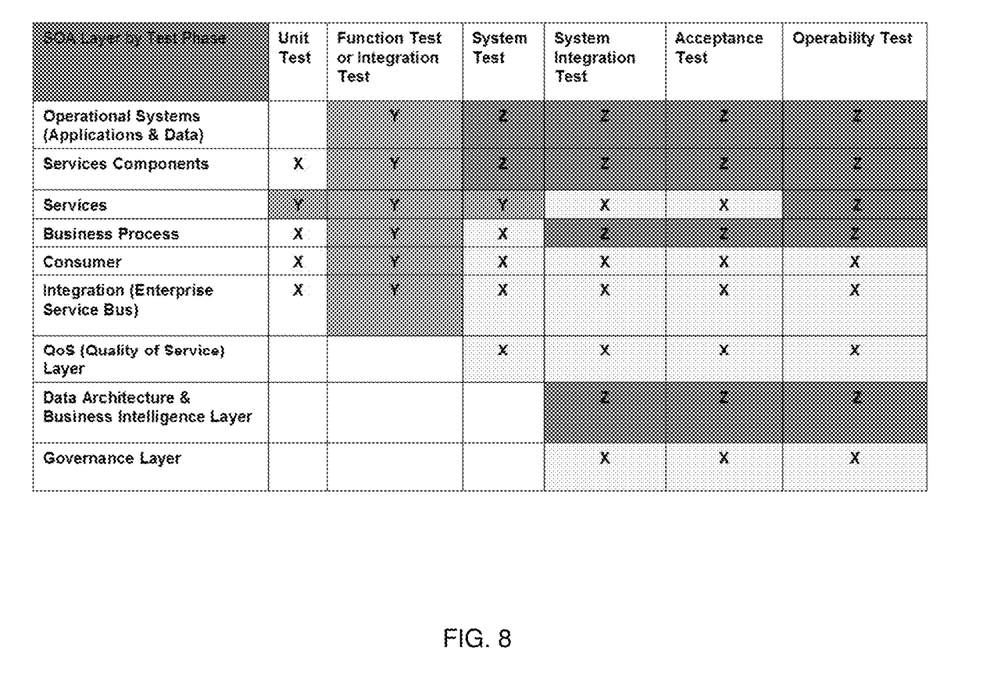
FIG. 8 shows achieved benefits implementing aspects of the invention.

The framework of the present invention provides for launching Rational Test Programs from a framework as test drivers. The framework of the present invention also consolidate logs and reports in a central repository and can be integrated with external test tools such as Segue®, etc. The framework of the present invention also provides record and playback for functional verification using appropriate test tools, and can use test agents for execution of manual actions (record-playback). The framework of the present invention also provides a solution for verifying scenarios (functional verification and performance evaluation) that typically requires manual verification or requires predefined setup of automated testing. Additional benefits include the following metrics for Business Process Verification:

Business Process functional verification testing (FVT);
Business Process E2E Performance end to end performance; and
Business Processes SIT system integration testing FIG. 8 shows achieved benefits implementing aspects of the invention. More specifically, the boxes marked by "X" show test phases that, prior to the present invention, could not be tested for SOA quality assurance due to lack or appropriates test tools. However, in accordance with the present invention, these test phases can now be properly tested for SOA quality assurance. The boxes marked by "Y" show SOA specific coverage that are currently supported by Rational Tools (Rational Tools are products manufactured and supported by International Business Machines Corp.). The boxes marked by "Z" show additional test phases that are supported by the framework of the present invention.

Example Implementation of the Present Invention

In an illustrative example implementing aspects of the invention, the SOA based Systems Integration Test Development Framework can be used for performing real-time and automated functional verification of transactions, for a scenario that contains long running transactions. More specifically, the specific example assumes a case study of an auto mortgage payment from Bank1 to Bank2 for a user of Bank1. This is called the 'major activity'. Auto mortgage payment means that the user has scheduled Bank1 to pay Bank2 a certain amount of money every month on a certain date. In this example, the Primary Agent detects that there is a start of the major activity. The Primary Agent then requests that appropriate validations be done to ensure the activity was successfully executed. Action Agent 1 validates that Bank1 has initiated the payment when due, and also validates Bank1's user account standing and validates that Bank1 notifies the user of automated debit. Action Agent 2 validates that Bank2 has processed the payment received and validates that Bank2 notified the user of mortgage payment status.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer system for verifying a particular function of a particular business process, the system comprising:
   a central processing unit (CPU), a computer readable memory and a non-transitory computer readable storage media; first program instructions to detect, by one or more primary agents, a start of the particular business process;
   second program instructions to provide, by one or more action agents, a verification function of the particular business process;
   third program instructions to determine, by a service manager, context look-up services for the one or more primary agents;
   fourth program instructions to forward a reference of an action agent which is responsible for a particular verification function of the particular business process to a requesting primary agent;
   fifth program instructions to invoke the action agent which performs the particular verification function of the particular business process; and
   sixth program instructions to add at least one of a new primary agent, new action agent, and new business processes without disrupting an existing test run,
   wherein the first, second, third, fourth, fifth, and sixth program instructions are stored on the non-transitory computer readable storage media for execution by the CPU via the computer readable memory.

2. The computer system of claim 1, further comprising:
   seventh program instructions to aggregate reports in a central repository;
   eighth program instructions to consolidate the reports in the central repository; and
   ninth program instructions to display improvements to test phases including a unit test, a function test or an integration test, a system test, a system integration test, an acceptance test, and an operability test for different Service Oriented Architecture (SOA) layers.

3. The computer system of claim 2, further comprising tenth program instructions to provide the reference of the action agent to the requesting primary agent.

4. The computer system of claim 1, wherein the particular business process is one of a plurality of particular business processes; and
   the computer system further comprises:
      seventh program instructions to monitor the plurality of particular business processes asynchronously; and
      eighth program instructions to verify the plurality of particular business processes asynchronously.

5. The computer system of claim 2, wherein the aggregated reports are generated asynchronously by at least one of the service manager, the one or more primary agents and the one or more action agents.

6. The computer system of claim 1, wherein the one or more primary agents is implemented using a common interface and attached to a trigger that initiates the particular business process.

7. The computer system of claim 1, wherein the service manager is configured to de-couple the one or more primary agents from the one or more action agents.

8. The computer system of claim 1, wherein the context-look up services comprise a look up table including at least a description of functionality of the one or more action agents.

9. The computer system of claim 1, wherein the one or more primary agents invoke the one or more action agents outside of the service manager.

10. The computer system of claim 1, wherein the service manager is configured to provide services for inter action agent communication that requests execution of a subset of a scenario verification, and the subset of the scenario verification is a task within the particular verification function of the particular business process which cannot be performed by the invoked action agent.

11. The computer system of claim 1, wherein the one or more action agents are standalone agents configured to execute business process verification on-demand as requested by the one or more primary agents.

12. The computer system of claim 1, wherein each of the one or more action agents provide performance metrics.

13. The computer system of claim 1, further comprising:
    seventh program instructions to identify a second action agent which performs a subset of the particular verification function; and
    eighth program instructions to invoke, by a requesting action agent, the second action agent to perform the subset of the particular verification function.

14. The computer system of claim 1, further comprising determining whether the particular business process is a complex business process which comprises a set of greater than two business processes that cannot be verified by a single action agent.

15. The computer system of claim 1, further comprising seventh program instructions to query the service manager to determine the action agent to be invoked for the detected particular business process, wherein the query comprises a series of web service calls to the service manager to determine which of the one or more action agents can be invoked, the reference of the action agent responsible for the particular verification function is an address of the action agent, and the invoking the action agent comprises making a web service call to the action agent using the address of the action agent, and starting the particular verification function of the particular business process.

16. The computer system of claim 15, wherein the particular verification function of the particular business process is a part of a test phase for a service oriented architecture (SOA) quality assurance program, and the one or more primary agents is dedicated to the particular business process, implemented as programming language, and attached to a trigger that starts the particular business process such that the one or more primary agents can detect the start of the particular business process.

17. The computer system of claim 1, wherein the action agent verifies logic of the particular business process without performing playback of the business process.

18. The computer system of claim 1, further comprising seventh program instructions to provide and feed performance related metrics, and the action agent is further configured to simulate an agent.

19. The computer system of claim 1, wherein the one or more primary agents are implemented using a business process execution language (BPEL) and communicate using web services.

20. The computer system of claim 19, further comprising seventh program instructions to perform real-time and automated functional verification for the particular business process.

* * * * *